(12) United States Patent
Fleischmann et al.

(10) Patent No.: US 12,074,499 B2
(45) Date of Patent: Aug. 27, 2024

(54) BASIC BODY FOR AN ELECTRIC MOTOR

(71) Applicant: Metabowerke GmbH, Nuertingen (DE)

(72) Inventors: Bernd Fleischmann, Weilheim (DE);
Michael Schmohl, Ammerbuch (DE);
Stefan Bauer, Oberboihingen (DE);
Enrico Floete, Stuttgart (DE); Matthias Hiller, Altenriet (DE); Bernd Wiesner, Owen (DE); Thomas Stenzel, Ostfildern (DE)

(73) Assignee: METABOWERKE GMBH, Nuertingen (DE)

( * ) Notice: Subject to any disclaimer, the term of this patent is extended or adjusted under 35 U.S.C. 154(b) by 403 days.

(21) Appl. No.: 17/431,494

(22) PCT Filed: Feb. 21, 2020

(86) PCT No.: PCT/EP2020/054660
§ 371 (c)(1),
(2) Date: Aug. 17, 2021

(87) PCT Pub. No.: WO2020/169821
PCT Pub. Date: Aug. 27, 2020

(65) Prior Publication Data
US 2022/0149693 A1    May 12, 2022

(30) Foreign Application Priority Data

Feb. 22, 2019 (DE) ..................... 10 2019 104 557.6

(51) Int. Cl.
*H02K 5/22* (2006.01)
*H02K 3/50* (2006.01)
(Continued)

(52) U.S. Cl.
CPC ............... *H02K 5/225* (2013.01); *H02K 3/50* (2013.01); *H02K 5/1732* (2013.01); *H02K 11/33* (2016.01);
(Continued)

(58) Field of Classification Search
CPC .......... H02K 5/225; H02K 11/33; H02K 3/50; H02K 5/1732; H02K 2203/03; H02K 2203/06
(Continued)

(56) References Cited

U.S. PATENT DOCUMENTS 1,347,732 A * 7/1920 Cooper ............... F04D 13/0646
415/58.4
7,785,156 B1 8/2010 Liao
(Continued)

FOREIGN PATENT DOCUMENTS

DE         10253235 A1   6/2004
DE    102004027632 A1   1/2006
(Continued)

OTHER PUBLICATIONS

Notice of Reasons for Rejection received for Japanese Patent Application Serial No. JP2021-572702 dated Aug. 30, 2022, 11 pages (6 pages of English translation and 5 pages of official copy).
(Continued)

*Primary Examiner* — Terrance L Kenerly
(74) *Attorney, Agent, or Firm* — Neugeboren O'Dowd PC

(57) ABSTRACT

The invention relates to a basic body (1) for an electric motor (2), which comprises the following features: a substantially cylindrical outer wall (3), which forms a rotor space (4) for receiving a rotor (5) at least partially inside the outer wall (3) and on which a winding (6) can be mounted at least partially outside the latter; a laminated core (7) which is held by the outer wall (3); a receiving space (9) which serves to receive
(Continued)

a printed circuit board (12) or another component of the electric motor (2) and which adjoins the rotor space (4); a partition wall (10) separating the receiving space (9) from the rotor space (4); at least one orienting device (13) for positionally orienting the printed circuit board (12) or the other component of the electric motor (2) inside the receiving space (9); a receptacle (17) for a cover (18) which closes the rotor space (4), said receptacle being situated on the outer wall (3) on the side of the rotor space (44) opposite to the partition wall (10); and an inner wall (20), which adjoins the partition wall (10), for receiving a bearing (21) for the rotor (5), said inner wall, together with the outer wall (3), creating the receiving space (9).

14 Claims, 9 Drawing Sheets

(51) Int. Cl.
    *H02K 5/173* (2006.01)
    *H02K 11/33* (2016.01)

(52) U.S. Cl.
    CPC ..... *H02K 2203/03* (2013.01); *H02K 2203/06* (2013.01)

(58) Field of Classification Search
    USPC .......................................................... 310/71
    See application file for complete search history.

(56) References Cited

U.S. PATENT DOCUMENTS

| | | | | |
|---|---|---|---|---|
| 11,043,871 | B2 * | 6/2021 | Horng | H02K 5/10 |
| 11,476,527 | B2 * | 10/2022 | Sheeks | H02K 9/06 |
| 2007/0286753 | A1 | 12/2007 | Ihle | |
| 2018/0102681 | A1 * | 4/2018 | Prüssmeier | H01F 6/006 |
| 2020/0006999 | A1 * | 1/2020 | Lahajnar | H02K 1/276 |

FOREIGN PATENT DOCUMENTS

| | | |
|---|---|---|
| DE | 60309778 T2 | 10/2007 |
| DE | 102007020534 A1 | 11/2007 |
| DE | 102011054958 A1 | 5/2013 |
| DE | 102011088518 A1 | 6/2013 |
| DE | 102012211183 A1 | 1/2014 |
| DE | 102013202335 A1 | 8/2014 |
| DE | 102014213324 A1 | 1/2016 |
| DE | 102015110624 A1 | 1/2017 |
| DE | 102017104892 A1 | 9/2018 |
| DE | 102017105089 A1 | 9/2018 |
| EP | 1422809 A1 | 5/2004 |
| JP | H10-127007 A | 5/1998 |
| JP | H10-243597 A | 9/1998 |
| JP | 2008-187755 A | 8/2008 |
| JP | 2011-193572 A | 9/2011 |
| JP | 2013-207824 A | 10/2013 |
| JP | 2018-117105 A | 7/2018 |
| JP | 2019-021604 A | 2/2019 |
| WO | 2010034579 A2 | 4/2010 |

OTHER PUBLICATIONS

German Patent Office, "Office Action Regarding German Patent Application No. 102019104557.6", Nov. 20, 2019, p. 8, Published in: DE.

Dupperon, Nathalie, "International Search Report and Written Opinion Regarding International Application No. PCT/EP2020/054660", May 13, 2020, p. 12, Published in: NL.

Schmitz, "Methodical Designing of Injection Mouldings", Nov. 13, 1984, p. 5, Published in: DE.

China Patent Office, "First Office Action", dated My 9, 2024.

* cited by examiner

BASIC BODY FOR AN ELECTRIC MOTOR

CROSS-REFERENCE TO RELATED APPLICATION

This application is a national phase of PCT patent application No. PCT/EP2020/054660 filed on Feb. 21, 2020, which claims priority to German Patent Application No. 10 2019 104 557.6 filed Feb. 22, 2019 and entitled "BASIC BODY FOR AN ELECTRIC MOTOR", the entire contents of which are incorporated herein by reference.

TECHNICAL FIELD

The disclosure relates to a main body for an electric motor, and to an electric motor.

DE 10 2007 020 534 A1 has disclosed a brushless electric motor with a stator and a rotor. In a manner known per se, the stator has a laminated core, in which the rotor which is fitted with permanent magnets can rotate.

DE 10 2011 088 518 A1 has disclosed a stator for an electric motor and a method for producing a stator of this type. Here, the stator is formed from two stator halves which are connected to one another.

BACKGROUND

Brushless electric motors of this type which are equipped with rotors fitted with permanent magnets are being used more and more frequently even in electric hand-held power tools. Since the different types of electric hand-held power tools make completely different requirements on an electric motor, it is not possible or at least not appropriate for one and the same electric motor to be used for different types of electric hand-held power tools. In the past, this has led to a multiplicity of completely different electric motors, which substantially increases not only the production costs, but also the development costs for said electric motors.

SUMMARY

It is an object of the present disclosure to provide a main body for an electric motor, which main body can be used equally in the case of electric motors which are equipped differently and are used for different purposes.

According to the disclosure, said object is achieved by way of the features which are mentioned in the appended claims.

The main body according to the disclosure is configured in the manner of a kit and can be used for a very wide variety of intended uses on account of its multiplicity of features which are adapted to a very wide variety of requirements which are made on an electric motor.

Here, the outer wall forms a rotor space, in which the rotor of the electric motor can be received. At the same time, the outer wall serves to receive a winding on its outer side, and to secure a laminated core which forms a part of the stator. The laminated core is preferably overmolded with the material of the outer wall, and is therefore integrated into said outer wall. With regard to the interconnection of the winding, both a star-shaped and a triangular interconnection and any desired other interconnection can be realized without problems. The same also applies to the commutation of the electric motor which is equipped with the main body, which commutation can be configured in a manner known per se as a block commutation, a sine commutation, an FOC or field oriented control, or as another known commutation type.

Especially by way of a field oriented control, the degree of efficiency of the electric motor which is equipped with the main body according to the disclosure can in part be increased considerably.

According to the disclosure, the rotor space is adjoined by a receiving space, in which a printed circuit board or another component of the electric motor can be received. It goes without saying that it is only possible and not necessarily required for a printed circuit board or another component of the electric motor to be received in the receiving space, for which reason the main body (as indicated above) can be used for a very wide variety of embodiments of electric motors.

The receiving space is divided from the rotor space by means of a dividing wall. Here, the dividing wall represents a decoupling of the printed circuit board which can be received in the receiving space with respect to the rotor, in particular with respect to the permanent magnets which are arranged on said rotor. In this way, the printed circuit board is protected against electrostatic voltages or an electrostatic charge. Here, the position of the printed circuit board or of the other component which is received in the receiving space can be oriented by way of the orienting device which is situated within the receiving space.

If, in the case of certain applications, for example in the case of electric hand-held power tools which are subjected to pronounced contamination, it is required for the rotor space to be encapsulated, a cover can be attached on the receptacle according to the disclosure for a cover of this type, which receptacle is situated on the outer wall on that side of the rotor space which lies opposite the dividing wall, in order to prevent a contamination and possibly damage of the electric motor.

Finally, the inner wall which adjoins the dividing wall makes it possible to receive a bearing, in order to make suitable mounting of the rotor or the rotor shaft on the main body possible.

The main body according to the disclosure can therefore be used universally for a very wide variety of types and designs of electric motors, it being possible for said main body to be adapted specifically to the respective requirements. One particular advantage of the solution according to the disclosure consists in its high flexibility, since the main body can be produced by way of different, sequential method steps, it being possible for certain method steps to be omitted and others to be performed depending on the desired embodiment of the electric motor which has the main body.

It can be provided in one very advantageous development of the disclosure that the dividing wall has an opening for leading through a rotor shaft. As a result, the rotor shaft which is connected to the rotor can be received in the main body in a very simple way, and can optionally be mounted on said main body.

It can be provided in a further very advantageous development of the disclosure that the laminated core forms a plurality of teeth which project to the outside from the outer wall and on which the winding can be received. As a result of the teeth of the laminated core which project from the outer wall to the outside, the winding can be attached to the main body in a very simple way, with the result that the electric motor which has the main body according to the disclosure can be manufactured very inexpensively.

In order to simplify the positioning of the rotor within the main body, it can be provided in a further advantageous refinement of the disclosure that the opening for leading through the rotor in the dividing wall has a non-round cross section.

If, in a further advantageous refinement of the disclosure, at least two webs for supporting the printed circuit board or the other component of the electric motor are arranged on the dividing wall, the printed circuit board or another component can be supported reliably on the main body. In addition, the webs ensure a tolerance compensation and spacing of the printed circuit board from the dividing wall, with the result that electronic elements can be attached on both sides of the printed circuit board.

A very simple positional orientation of the printed circuit board or the other component of the electric motor results if the at least one orienting device has at least one projection which is arranged on at least one of the webs for engagement into an opening of the printed circuit board or of the other component of the electric motor.

In order for it to be possible for the winding to be arranged at the desired positions, it can be provided, furthermore, that the outer wall has a plurality of cutouts for leading through the winding.

Manufacturing of the main body can be simplified considerably if the receptacle for the cover which closes the rotor space is configured as a peripheral cutout on the inner circumference of the outer wall.

In order for it to be possible for a possibly provided cover which closes the rotor space to be oriented exactly, it can be provided, furthermore, that the receptacle for the cover which closes the rotor space has at least one slot for the positional orientation of the cover.

If, in a further advantageous refinement of the disclosure, the receiving space is formed by way of a peripheral depression between the outer wall and the inner wall, and serves to receive connector wires for the interconnection of the winding, this results in highly satisfactory protection for said connector wires.

In order to make a simple accommodation of a position transmitter for the determination of the angular position of the rotor possible, furthermore, an axial extension for a position transmitter can be provided on that side of the dividing wall which faces away from the rotor space.

Some embodiments of the disclosure relate to an electric motor with a rotor, a winding and a main body.

An electric motor of this type can be used in a highly universal manner and, in particular, for a wide variety of electric hand-held power tools, by said electric motor being equipped with the respectively required or desired components or elements. In particular, the electric motor can be fed both by the power network and by a rechargeable battery, it also being possible in both cases for the safety spacings which are required for insulation for high-voltage applications to be maintained. Furthermore, the electric motor can be supplied with current via the power network or by means of a battery or a rechargeable battery. Moreover, it is advantageously possible for the electric motor to be operated by way of a wide variety of electronic open-loop and/or closed-loop controllers.

It can be provided in one advantageous development of the electric motor that the at least one projection for fastening the printed circuit board or the other component of the electric motor is staked. This is a very simple possibility for fixing the printed circuit board or another component of the electric motor.

A likewise simple and insensitive electric connection of the winding to a controller of the electric motor results if connector wires which serve for the interconnection of the winding are received via respective plug terminals in a plug housing, it being possible for the plug housing to be connected to a plug receptacle.

If, here, the plug housing can be connected by means of a snap-in connection to the plug receptacle, this results in very simple assembly of said components to one another.

In addition, it is to be noted that terms such as "comprising", "have" or "with" do not rule out any further features or steps. Furthermore, terms such as "a" or "the" which indicate a singular number of steps or features do not rule out a plural number of features or steps, and vice versa.

Further features and advantages of the disclosure result from the following description of one exemplary embodiment of the disclosure. The figures show a plurality of features of the disclosure in combination with one another. It goes without saying that a person skilled in the art is also capable of considering them separately from one another, however, and possibly combining them to form further appropriate sub-combinations, without having to exercise an inventive step for this purpose.

DETAILED DESCRIPTION

Figure 1:
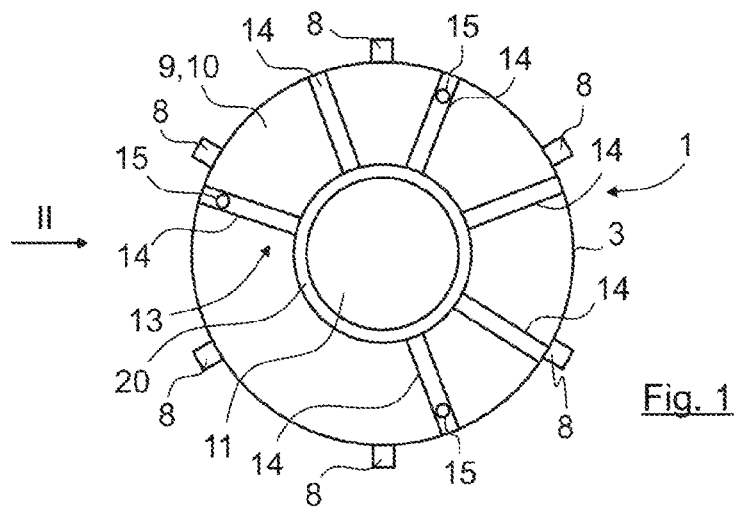
FIG. 1 shows a plan view of a main body according to the disclosure for an electric motor.
Figure 2:
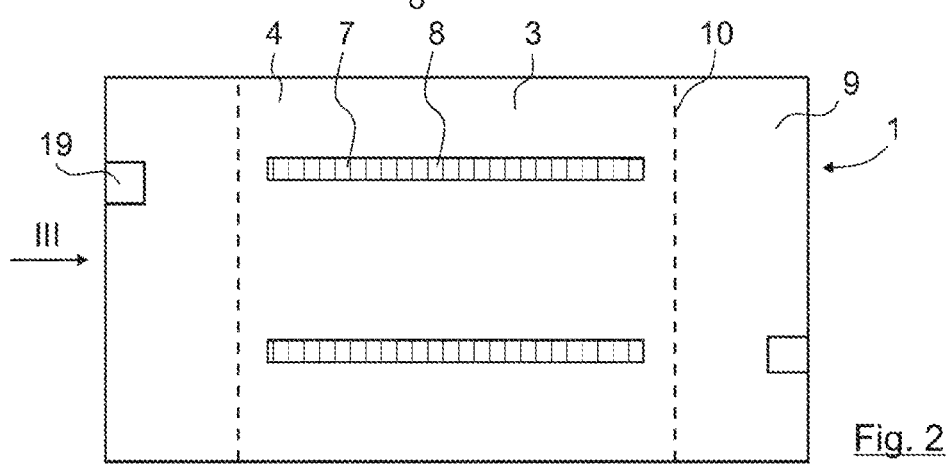
FIG. 2 shows a view of the main body in accordance with the arrow II from FIG. 1.
Figure 3:
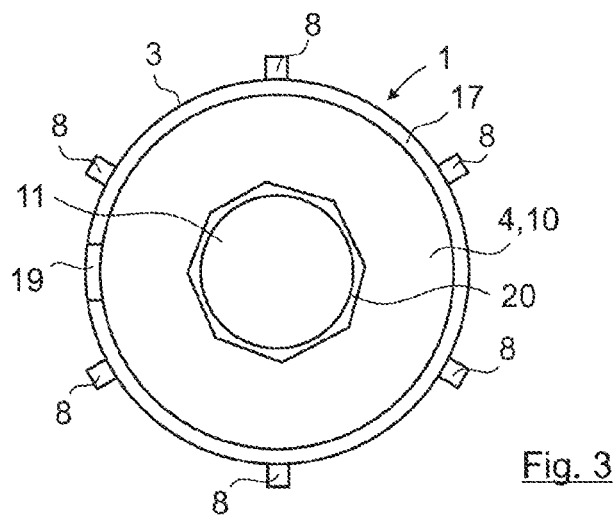
FIG. 3 shows a view of the main body in accordance with the arrow III from FIG. 2.
Figure 4:
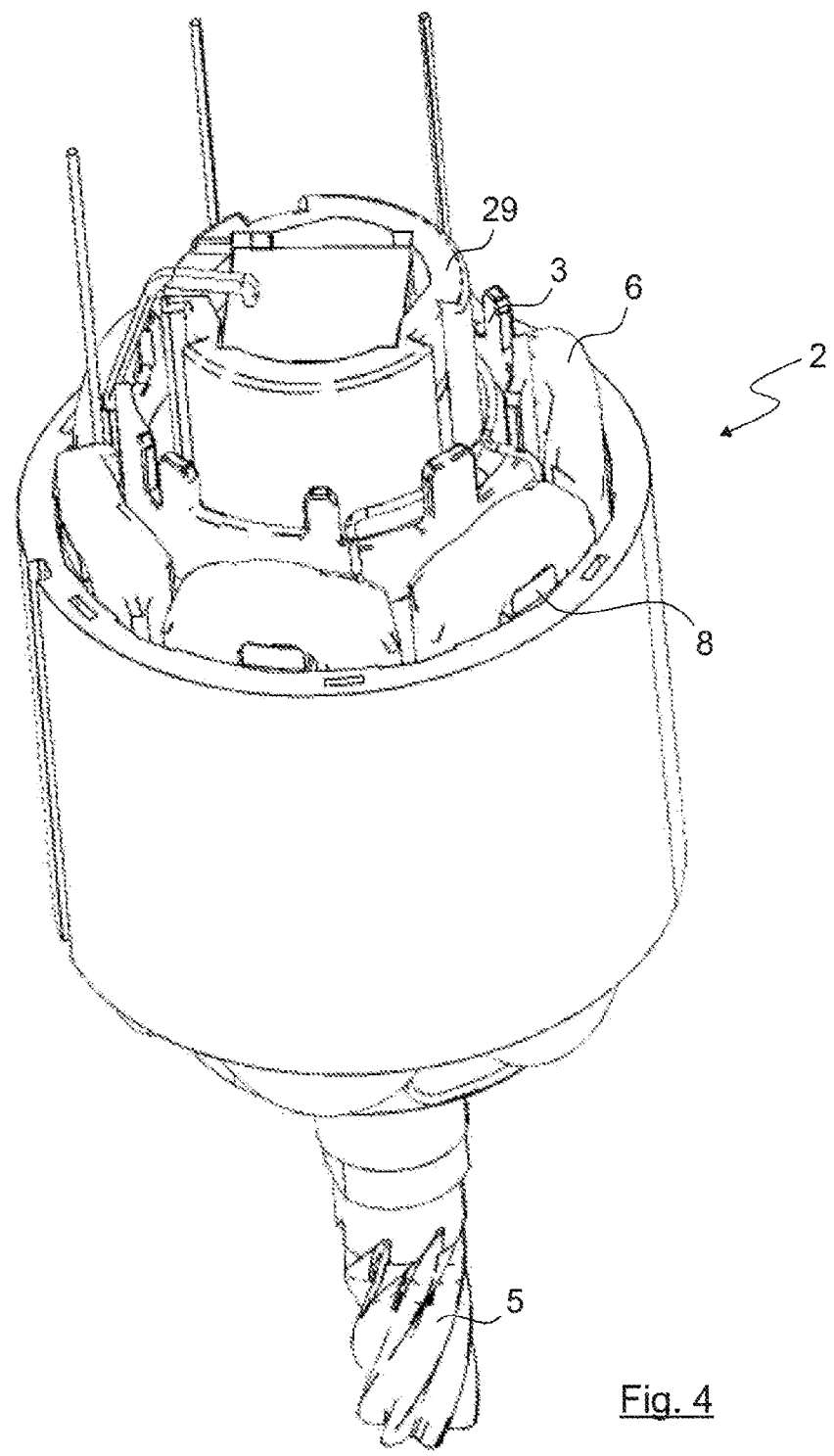
FIG. 4 shows a perspective view of an electric motor according to the disclosure with a rotor, a winding and a main body according to the disclosure.
Figure 5:
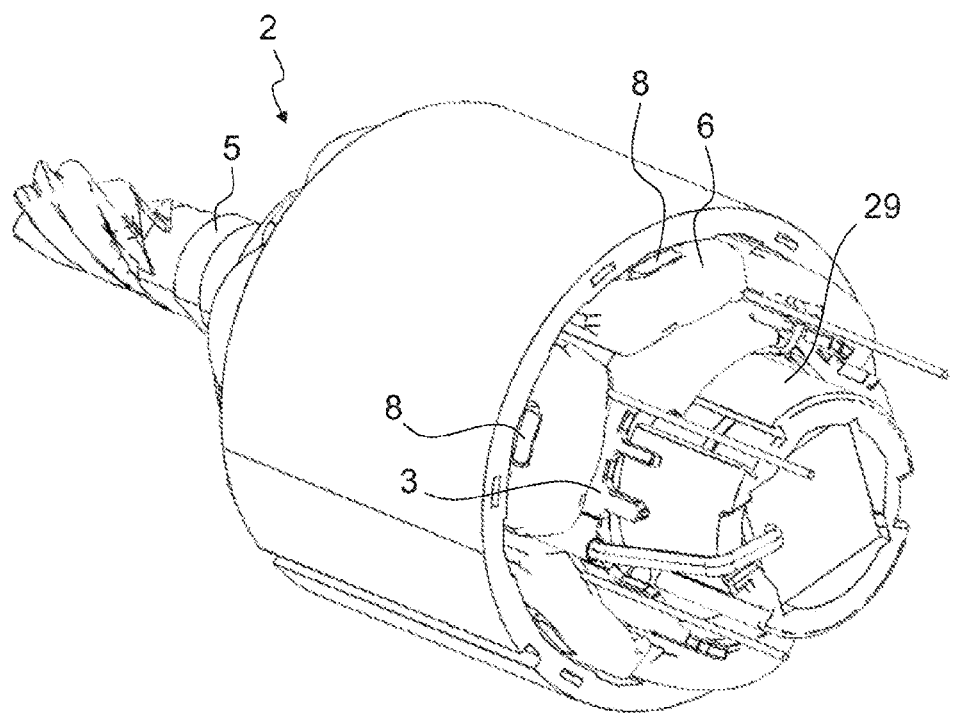
FIG. 5 shows a further perspective view of the electric motor from FIG. 4.
Figure 6:
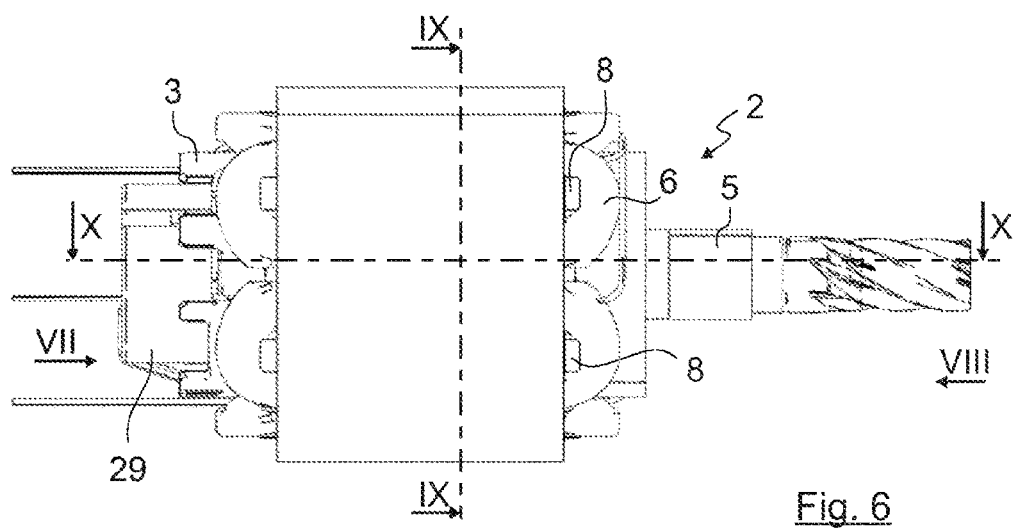
FIG. 6 shows a side view of the electric motor according to FIGS. 4 and 5.
Figure 7:
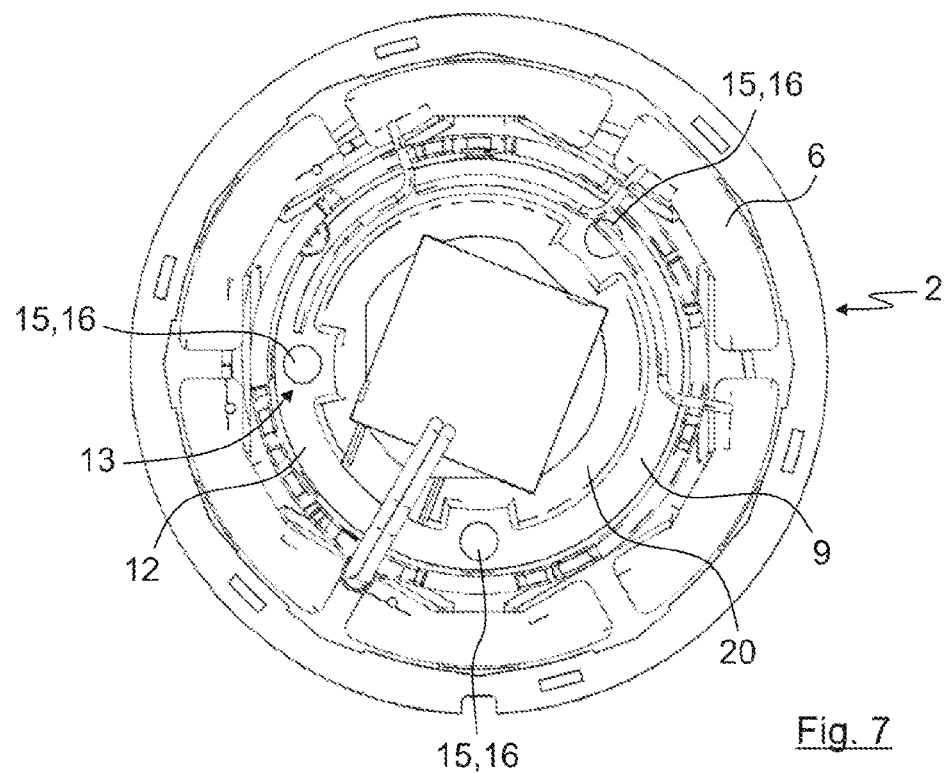
FIG. 7 shows a view of the electric motor in accordance with the arrow VII from FIG. 6.
Figure 8:
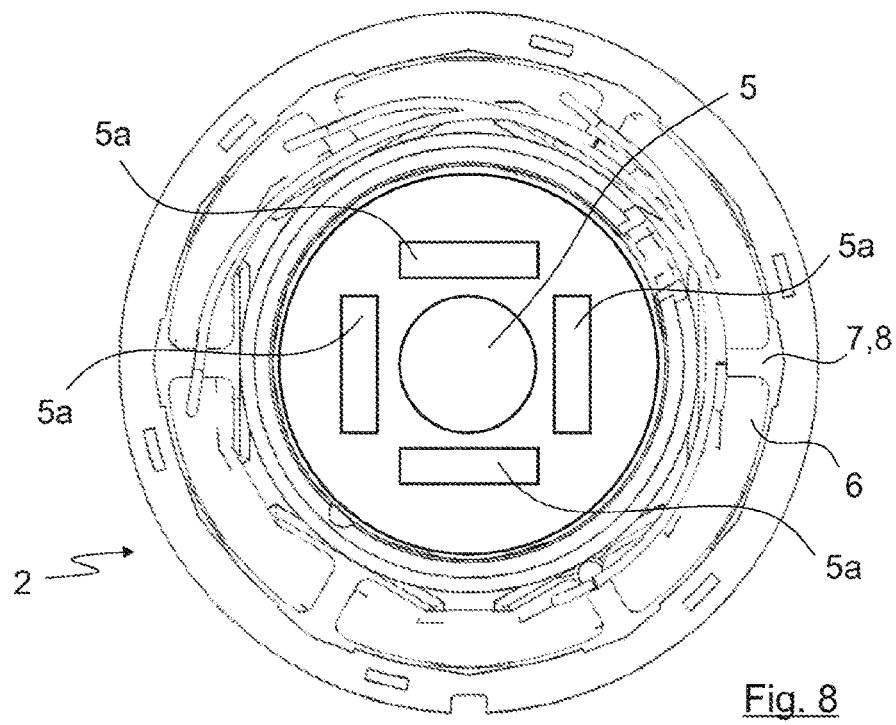
FIG. 8 shows a view of the electric motor in accordance with the arrow VIII from FIG. 6.
Figure 9:
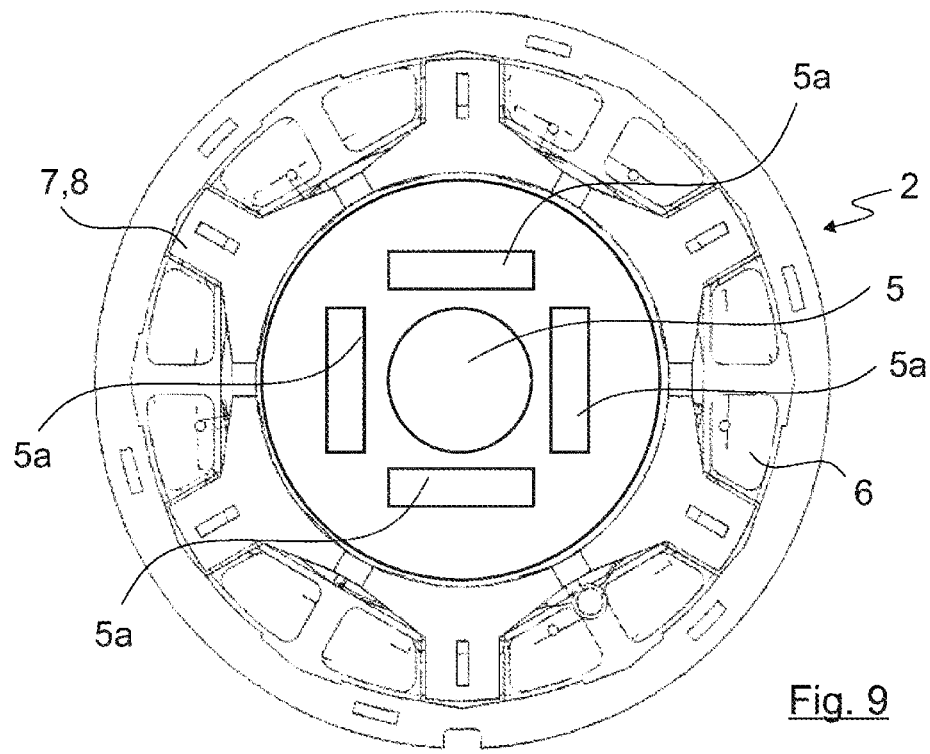
FIG. 9 shows a section through the electric motor in accordance with the line IX-IX from FIG. 6.
Figure 10:
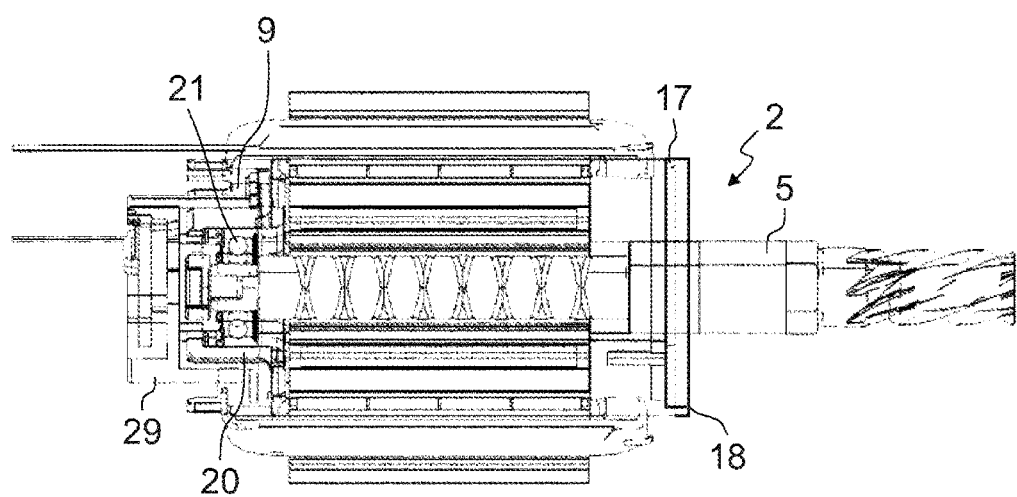
FIG. 10 shows a section through the electric motor in accordance with the line X-X from FIG. 6.
Figure 11:
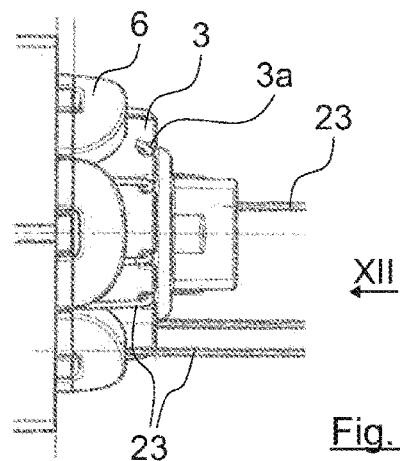
FIG. 11 shows a side view of a further embodiment of the main body according to the disclosure for the electric motor.
Figure 12:
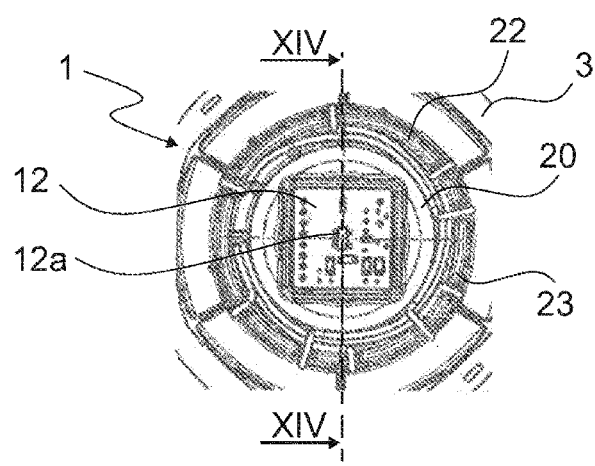
FIG. 12 shows a view in accordance with the arrow XII from FIG. 11.
Figure 13:
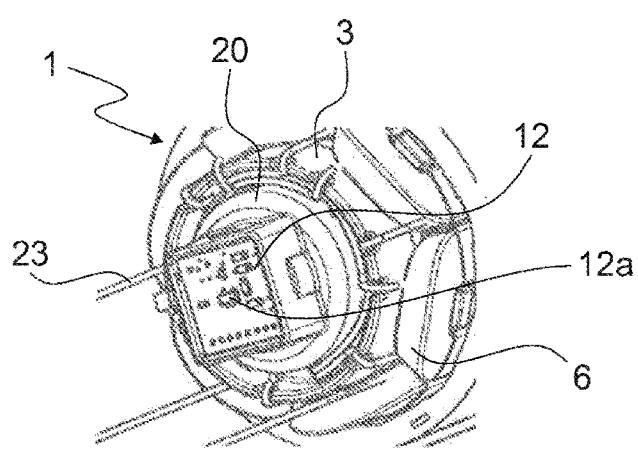
FIG. 13 shows a perspective view of the main body of FIGS. 11 and 12.

FIGS. 1, 2 and 3 show a highly diagrammatic illustration of a main body 1 for an electric motor 2 which is shown in greater detail in FIGS. 4 to 11. The electric motor 2 is provided, in particular, for use in an electric hand-held power tool, for example an angle grinder, a power drill, a saw or another electric hand-held power tool. In order for it to be possible for the main body 1 to be used in the case of electric motors 2 for a very wide variety of applications, said main body 1 is of highly universal configuration, as described in detail in the following text.

The main body 1 has a substantially cylindrical outer wall 3 which forms a rotor space 4 for receiving a rotor 5 (shown, for example, in FIG. 4) of the electric motor 2. The electric motor 2 is configured as a brushless electric motor, in the case of which the rotor 5 has a plurality of permanent magnets 5a or is fitted with the permanent magnets 5a. Here, as can be seen clearly, for example, in the section of FIG. 11, the rotor 5 which has a rotor shaft 5b in a manner known per se is arranged at least partially within the rotor space 4 or within the outer wall 3.

Furthermore, a coil or winding 6 (shown, for example, in FIG. 4) can be attached to the outer wall 3 at least partially outside the outer wall 3. Moreover, the outer wall 3 serves to secure a laminated core 7 which is formed in a manner known per se from a multiplicity of individual laminations which are stacked above one another. In the present case, the laminated core 7 is overmolded with the material of the outer wall 3, preferably a suitable plastic material, and is integrated in this way into the outer wall 3 and therefore into the main body 1. With the winding or the windings 6 and the laminated core 7, the main body 1 forms a stator for the electric motor 2. The effect which results by way of the energization of the winding 6, namely the rotation of the rotor 5 within the winding 6 or within the stator, is known per se and will therefore not be described in greater detail herein.

It can be seen in FIG. 2 that the laminated core 7 forms a plurality of (in the present case, six) teeth 8 which project from the outer wall 3 to the outside and on which the winding 6 can be received. Here, one of the windings 6 preferably runs around each tooth 8. The winding 6 can be wound, for example, on a one-dimensionally arranged carrier element (not shown). In order to attach the winding 6 to the main body 1, said carrier element can then be deformed, in order to produce the three-dimensional contour of the winding 6. To this end, the carrier element can have, for example, joints or the like. Here, the laminations which form the laminated core 7 are of substantially annular configuration, each of the individual laminations having the total of six teeth 8 on its outer circumference. Moreover, the outer wall 3 has a plurality of cutouts 3a which serve to lead through the winding 6 or an interconnection (shown in FIGS. 12 to 14 and 16 to 20) for the winding 6.

The rotor space 4 is adjoined by a receiving space 9 which is divided from the rotor space 4 by means of a dividing wall 10 which is formed by way of a planar surface and has an opening 11 for leading through the rotor 5. With the exception of the opening 11 which serves for leading through the rotor 5 or the rotor shaft 5b, the dividing wall 10 is completely closed and therefore seals the rotor space 4. An additional seal element can possibly also be used in this region. The receiving space 9 serves to receive an annular printed circuit board 12 (shown, for example, in FIG. 7), to which the wide variety of electronic components which serve to control the electric motor 2 can be attached. The printed circuit board 12 preferably has a sensor 12a (shown, for example, in FIGS. 12 and 13), in particular a Hall sensor which is used in the case of a block commutation of the electric motor 2, or a Hall PCBA, or is fitted therewith. A sensor 12a of this type can serve, for example, to determine the position of the rotor 5 as exactly as possible. To this end, it can interact with corresponding magnets which are arranged on the rotor 5. It is also possible, however, to use temperature sensors, for example. Instead of the printed circuit board 12, another component (not shown in greater detail) of the electric motor 2 can also be received in the receiving space 9. Said component can likewise be provided for receiving or securing a sensor for the electric motor 2. The abovementioned cutouts 3a in the outer wall 3 are situated in that region of the outer wall 3 which surrounds the receiving space 9. An interconnection (shown in FIGS. 12, 13 and 14) for the winding 6 can be situated above the printed circuit board 12, that is to say on that side of the printed circuit board 12 which faces away from the dividing wall 10. To this end, the outer wall 3 has a corresponding length in this region, that is to say the receiving space 9 is deep enough to receive both the printed circuit board 12 and the interconnection for the winding 6.

An orienting device 13 which serves for positional orientation of the angular position of the printed circuit board 12 or the abovementioned other component of the electric motor 2 within the receiving space 9 and therefore with respect to the winding 6 or the rotor 5 is situated on the dividing wall 10. Furthermore, at least two (in the present case, a total of six) webs 14 for supporting the printed circuit board 12 or the other component of the electric motor 2 are arranged on the dividing wall 10. In its mounted state, the printed circuit board 12 lies on the webs 14, with the result that components which are situated on the underside of the printed circuit board 12 are also spaced apart from the dividing wall 10. It goes without saying that a completely different number of webs 14 can also be provided. The height of the webs 14 can be selected in such a way that a desired spacing of the printed circuit board 12 from the rotor 5 which is situated on the other side of the dividing wall 10 can be set, in order to ensure sufficient coupling between possible sensors which are situated on the printed circuit board 12 and the rotor 5 and therefore a correct function of said sensors.

The orienting device 13 has at least one (in the present case, three) projections 15 which are arranged on at least one of the webs 14 (in the present case, on three different webs 14) for engaging into a bore 16 of the printed circuit board 12 or of the other component of the electric motor 2. For fastening or fixing of the printed circuit board 12 to the main body 1, the at least one projection 15 or the plurality of projections 15 can be staked after arranging of the printed circuit board 12 within the receiving space 9.

Moreover, a receptacle 17 is provided on that side of the rotor space 4 which lies opposite the dividing wall 10, which receptacle 17 serves to receive a cover 18 which closes the rotor space 4 and therefore protects it against the penetration of dust or other contaminants. Here, the receptacle 17 for the cover 18 which closes the rotor space 4 is configured as a peripheral cutout on the inner circumference of the outer wall 3. The receptacle 17 for the cover 18 is therefore provided on that side of the main body 1 which lies opposite the cutouts 3a. In addition, the receptacle 17 for the cover 18 has at least one slot 19 for the positional orientation of the cover 18, into which slot 19 a projection (not shown) of the cover 18 can engage. Moreover, the cover 18 can serve to receive a bearing (not shown) for mounting the rotor 5.

The dividing wall 10 is adjoined by a substantially cylindrical inner wall 20 which serves to receive a bearing 21 for the rotor 5 and produces the receiving space 9 together with the outer wall 3. The bearing 21 can be pressed onto the rotor 5.

At the same time, the inner wall 20 forms a centering means for the printed circuit board 12. The opening 11 for leading through the rotor 5, which opening 11 is situated in the dividing wall 10 and is surrounded by the inner wall 20, has a non-round cross section, in the present case an octagon.

The outer wall 1, the dividing wall 10, the webs 14, the projections 15 and the inner wall 20 of the main body 1 preferably consist of a suitable plastic material, and can be produced by means of injection molding. For this reason and on account of its shape, the main body 1 can also be called an overmolded tooth star.

Here, the outer wall 1, the dividing wall 10, the webs 14, the projections 15 and the inner wall 20 are preferably configured in one piece with one another, and are produced, in particular, by means of a single injection molding process. Here, on account of the above-described, highly universal configuration of the main body 1, only a single injection molding die is in principle required. As a result of the above-described non-round cross section of the opening 11, said injection molding die can be of very exact configuration in the region which produces the opening 11, as a result of which likewise exact, central positioning of the rotor 5 within the opening 11 is possible. As a result of the molding of the inner wall 20 which receives the bearing 21 for the rotor 5 onto the dividing wall 10, very simple sealing is achieved in this region, inter alia satisfactory sealing of the rotor space 4, without an additional cover, a casting compound or the like being required.

FIGS. 11 to 17 show a further embodiment of the main body 1 or of the electric motor 2 which is equipped therewith, which embodiment coincides in large parts with the above-described embodiment. It can be seen here that the receiving space 9 is formed by way of a peripheral depression 22 between the outer wall 3 and the inner wall 20. The peripheral depression 22 therefore corresponds to the receiving space 9. The peripheral depression 22 serves to receive connector wires 23 which in turn can be used for an interconnection of the winding 6. As a result, the connector wires 23 can be laid reliably and can be protected against abrasion. After the interconnection of the winding 6, the connector wires 23 can be potted with a potting compound (not shown). Here, the connector wires 23 run through the cutouts 3a which are provided in the outer wall 3. Furthermore, additional holding devices for holding the connector wires 23 can be dispensed with as a result of this accommodation. The depression 22 or, in this case, the receiving space 9 between the outer wall 3 and the inner wall 20 can also be called a labyrinth, since it prevents the penetration of dirt and the like into the region, in which the connector wires 23 for the winding 6 are situated. In principle, the winding 6 can be interconnected by means of a star-shaped or a triangular interconnection or any other interconnection.

Figure 14:
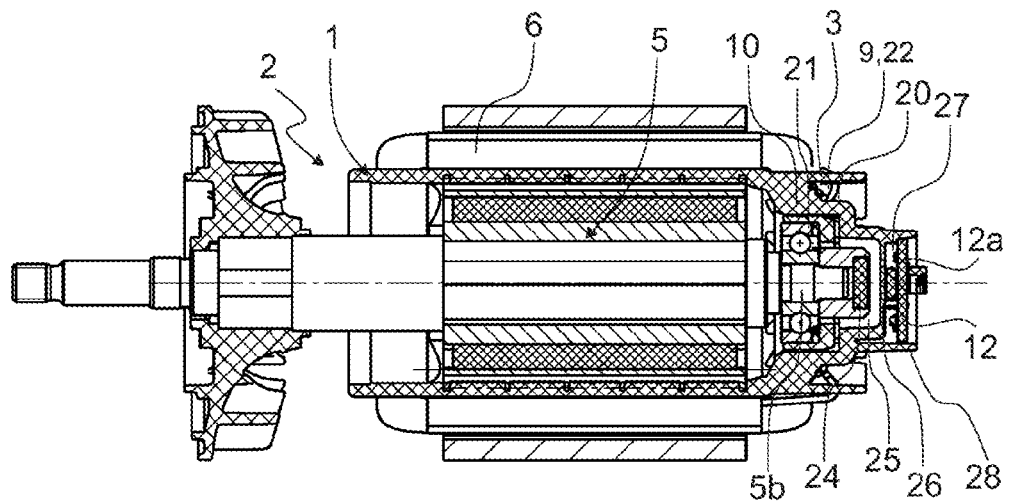
FIG. 14 shows a section according to the line XIV-XIV from FIG. 12.

It can be seen in the section of FIG. 14 that a position transmitter 24 is attached to the rotor shaft 5b. In order to receive the position transmitter 24, the inner wall 20 is adjoined by an axial extension 25. The axial extension 25 is closed off by way of a closure wall 26 which is configured in one piece with the main body 1. At the same time, the closure wall 26 forms a bottom of a further space 27, in which, in the present case, the printed circuit board 12 with the sensor 12a is arranged. In the present case, the sensor 12a is a position sensor which interacts with the position transmitter 24. The space 27 is surrounded by a circumferential wall 28 and is open on the side which faces away from the closure wall 26. In the case of the embodiment which is described with reference to FIGS. 1 to 10, the space 27 is formed by way of an end cap 29 which can be staked, clipped or connected in some other way to the main body 1.

Figure 15:
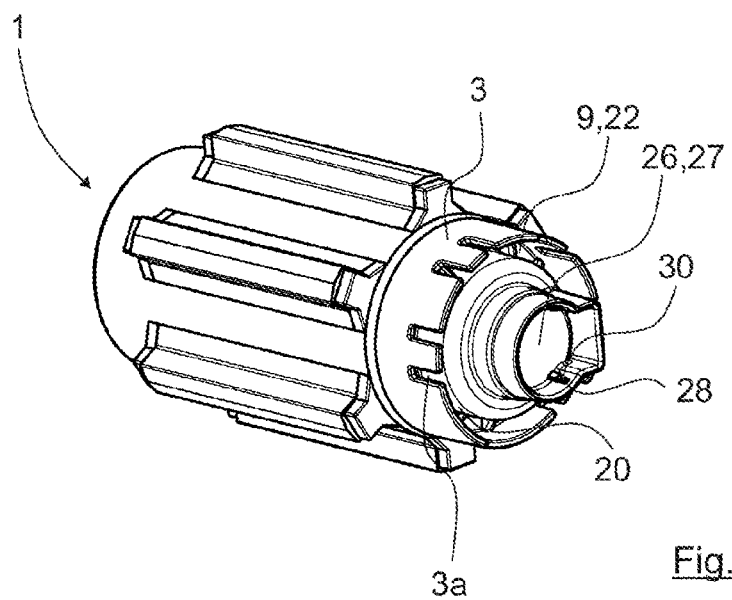
FIG. 15 shows a further illustration of the main body according to FIGS. 11 to 14.
Figure 16:
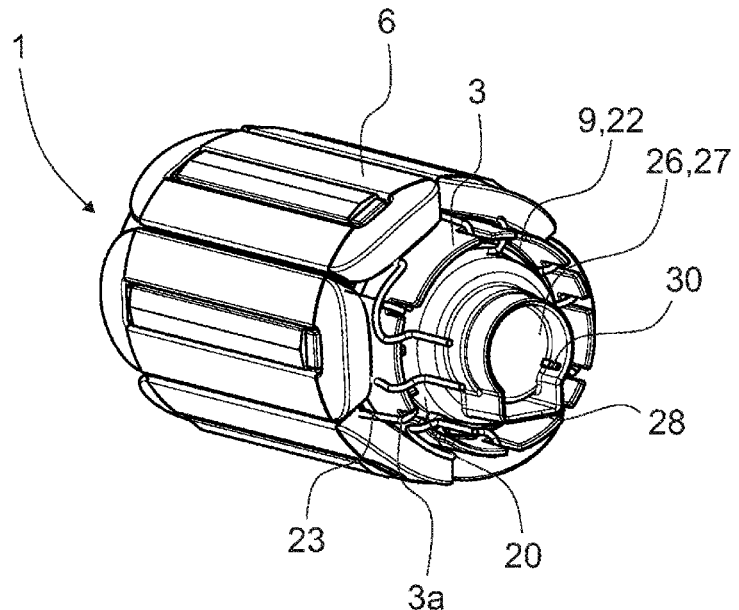
FIG. 16 shows a part of an electric motor with the main body from FIG. 15.
Figure 17:
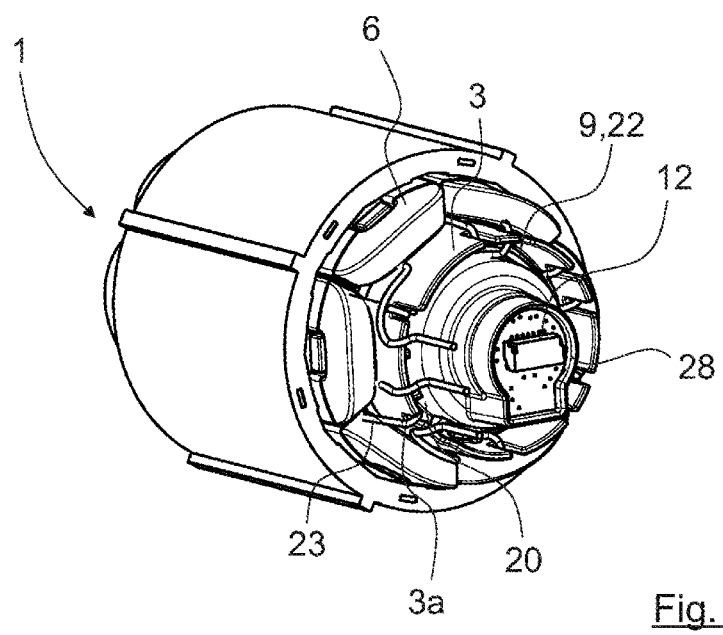
FIG. 17 shows the part of the electric motor from FIG. 16 with further attachment components.

It can be seen in FIG. 15 that, on its inner side, the circumferential wall 28 has a plurality of projections 30, by way of which positioning of the printed circuit board 12 is simplified.

Figure 18:
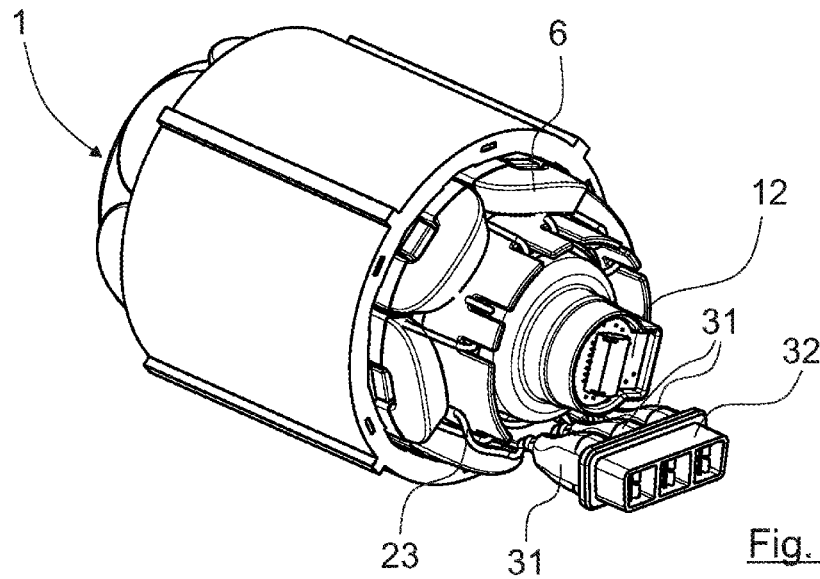
FIG. 18 shows a further embodiment of the electric motor according to the disclosure.
Figure 19:
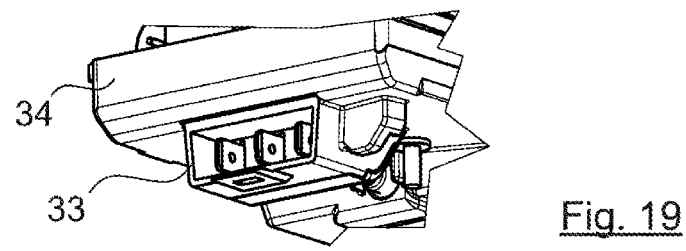
FIG. 19 shows a view of a component which can be connected to the electric motor from FIG. 18.
Figure 20:
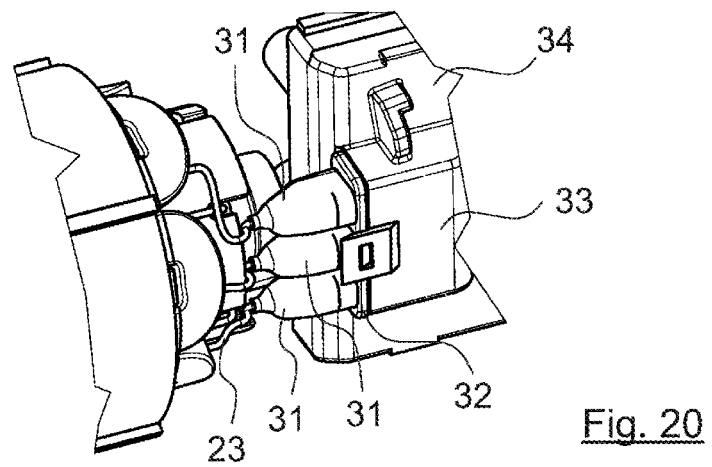
FIG. 20 shows a further view of the electric motor from FIG. 18 and of the component from FIG. 19.

FIGS. 18 to 20 show a further refinement of the electric motor 1. Here, the connector wires 23 which serve for the interconnection of the winding 6 are connected to respective plug terminals 31 which are received jointly in a plug housing 32. The plug housing 32 serves for plugging into a plug receptacle 33 which is formed directly onto an electronics cup 34. In a way which is not shown, plug-in tongues which are cast onto a circuit board in a way which is likewise not shown are provided in the plug receptacle 33. As a result, plugging of individual wires can be dispensed with, since all the connector wires 23 of the windings 6 can be connected by means of the one plug housing 32 to the controller for the electric motor 2, which controller is received in the electronics cup 34 in a way which is not shown. Furthermore, the dust resistance of the electric motor 2 with its controller is improved in this way.

The plug housing 32 and the plug receptacle 33 are in each case plastic components which can be produced in a simple way. In the present case, the plug housing 32 is connected to the plug receptacle 33 by means of a snap-in connection. In a way which is not shown, the plug housing 31 can be connected fixedly to the main body 1. In this way, during the assembly of the electric motor 2, its electric connection could take place at the same time.

The invention claimed is:

1. A main body for an electric motor comprising:
  a substantially cylindrical outer wall, the substantially cylindrical outer wall forming a rotor space for at least partially receiving a rotor within the outer wall, and wherein a winding is at least partially attached on an outside of the outer wall,
  a laminated core, the laminated core held by the outer wall;
  Wherein a receiving space is formed by way of a peripheral depression between the outer wall and the inner wall, and wherein the receiving space receives one or more connector wires for interconnection of the winding.

2. The main body of claim 1, wherein the dividing wall has an opening for leading through a rotor shaft or the rotor.

3. The main body of claim 2 wherein the opening for leading through the rotor in the dividing wall has a non-round cross section.

4. The main body of claim 1 wherein the laminated core includes a plurality of teeth for receiving the winding, wherein the plurality of teeth project to the outside from the outer wall.

5. The main body of claim 1 further comprising: at least two webs for supporting the printed circuit board or the other component of the electric motor, wherein the at least two webs are arranged on the dividing wall.

6. The main body of claim 5, wherein the at least one orienting device has at least one projection arranged on at least one web of the at least two webs for engagement into a bore of the printed circuit board or the other component of the electric motor.

7. The main body of claim 1 wherein the outer wall has a plurality of cutouts for leading through the winding.

8. The main body of claim 1, wherein the receptacle for the cover closing the rotor space comprises a peripheral cutout on an inner circumference of the outer wall.

9. The main body of claim 1, wherein the receptacle for the cover closing the rotor space has at least one slot for positional orientation of the cover.

10. The main body of claim 1, further comprising:
an axial extension for a position transmitter, wherein the axial extension is provided on a side of the dividing wall facing away from the rotor space.

11. An electric motor comprising a rotor, a winding and a main body, the main body comprising:
a substantially cylindrical outer wall, the substantially cylindrical outer wall forming a rotor space for at least partially receiving the rotor within the outer wall, and wherein the winding is at least partially attached on an outside of the outer wall;
a laminated core, the laminated core held by the outer wall;
a receiving space, the receiving space adjoining the rotor space, and wherein the receiving space receives a printed circuit board or another component of the electric motor, wherein the receiving space is formed by way of a peripheral depression between the outer wall and the inner wall, and wherein the receiving space receives one or more connector wires for interconnection of the winding;
a dividing wall, wherein the dividing wall divides the receiving space with respect to the rotor space;
at least one orienting device for positional orientation of the printed circuit board or the other component of the electric motor within the receiving space;
a receptacle for a cover, the receptacle situated on the outer wall and on a side of the rotor space opposite the dividing wall, and wherein the cover closes the rotor space; and
an inner wall adjoining the dividing wall, wherein the inner wall receives a bearing for the rotor, and wherein the inner wall and the outer wall produce the receiving space.

12. The electric motor of claim 11 further comprising: at least one projection for fastening the printed circuit board or the other component of the electric motor, wherein the at least one projection is staked.

13. The electric motor of claim 11, further comprising: one or more connector wires for interconnection of the winding, wherein the one or more connector wires are received via respective plug terminals in a plug housing, wherein the plug housing is connected to a plug receptacle.

14. The electric motor of claim 13, wherein the plug housing is connected to the plug receptacle via a snap-in connection.

* * * * *